United States Patent [19]

Salyer et al.

[11] 4,182,398

[45] Jan. 8, 1980

[54] CROSSLINKED CRYSTALLINE POLYMER AND METHODS FOR COOLING AND HEATING

[75] Inventors: Ival O. Salyer; Ruth A. Botham, both of Dayton; George L. Ball, III, West Carrollton, all of Ohio

[73] Assignee: The United States of America as represented by the United States Department of Energy, Washington, D.C.

[21] Appl. No.: 784,488

[22] Filed: Apr. 4, 1977

[51] Int. Cl.$^2$ ............................................. F28D 21/00
[52] U.S. Cl. ........................................ 165/1; 126/400; 165/104 S; 252/70
[58] Field of Search ......... 165/104 S, 107, 1, DIG. 4; 126/400; 252/70

[56] References Cited

U.S. PATENT DOCUMENTS

| | | | |
|---|---|---|---|
| 2,846,421 | 8/1958 | Pollock | 165/104 S X |
| 2,873,352 | 2/1959 | Franco | 219/46 |
| 2,888,424 | 5/1959 | Precopio et al. | 260/41 |
| 3,013,104 | 12/1961 | Young | 165/104 S X |
| 3,567,697 | 3/1971 | Bates et al. | 260/78.4 |
| 3,646,155 | 2/1972 | Scott | 260/23 H X |
| 3,780,262 | 12/1973 | Rudd | 219/341 |
| 3,923,947 | 12/1975 | Cook | 261/141 |
| 4,063,546 | 12/1977 | Schmid | 126/400 X |

OTHER PUBLICATIONS

Kaelble et al, DH *Crystalline Polymers as Heat Storage Materials . . . Systems,* Polymer Engineering and Science, vol. 15, No. 9, 9/1975, pp. 673 to 678.

*Primary Examiner*—Albert W. Davis, Jr.
*Attorney, Agent, or Firm*—R. V. Lupo; Stephen D. Hamel; Bruce Stevens

[57] ABSTRACT

The invention relates to crystalline polyethylene pieces having optimum crosslinking for use in storage and recovery of heat, and it further relates to methods for storage and recovery of heat using crystalline polymer pieces having optimum crosslinking for these uses. Crystalline polymer pieces are described which retain at least 70% of the heat of fusion of the uncrosslinked crystalline polymer and yet are sufficiently crosslinked for the pieces not to stick together upon being cycled above and below the melting point of said polymer, preferably at least 80% of the heat of fusion with no substantial sticking together.

14 Claims, 2 Drawing Figures

CROSSLINKED CRYSTALLINE POLYMER AND METHODS FOR COOLING AND HEATING

CROSS-REFERENCE TO RELATED APPLICATIONS

A related application is Ser. No. 784,179, filed of even date, having the same inventor, entitled "Crosslinked Crystalline Polymer For Cooling and Heating".

BACKGROUND OF INVENTION

1. Field of Invention

The invention relates to crystalline polyethylene pieces having optimum crosslinking for use in storage and recovery of heat, heat storage and recovery, particularly in the solar energy area, and for heating fluid to the temperatures required for absorbtion air conditioning.

2. Prior Art

In Polymer Engineering and Science, September, 1975, Vol. 15, No. 9, pp 673-8, D. H. Kaelble et al, "Crystalline Polymers as Heat Storage Materials In Passive Thermal Protection Systems", radiation crosslinked polyethylene is described for possible latent heat sink use, such as coatings on electronic equipment for protection against high temperature in space use.

SUMMARY OF THE INVENTION

The invention relates to crystalline polyethylene pieces having optimum crosslinking for use in storage and recovery of heat, and it further relates to methods for storage and recovery of heat using crystalline polymer pieces having optimum crosslinking for these uses. Crystalline polymer pieces are described which retain at least 70% of the heat of fusion of the uncrosslinked crystalline polymer and yet are sufficiently crosslinked for the pieces not to stick together upon being cycled above and below the melting point of said polymer, preferably at least 80% of the heat of fusion with no substantial sticking together.

DESCRIPTION OF PREFERRED EMBODIMENTS

Figure 1:
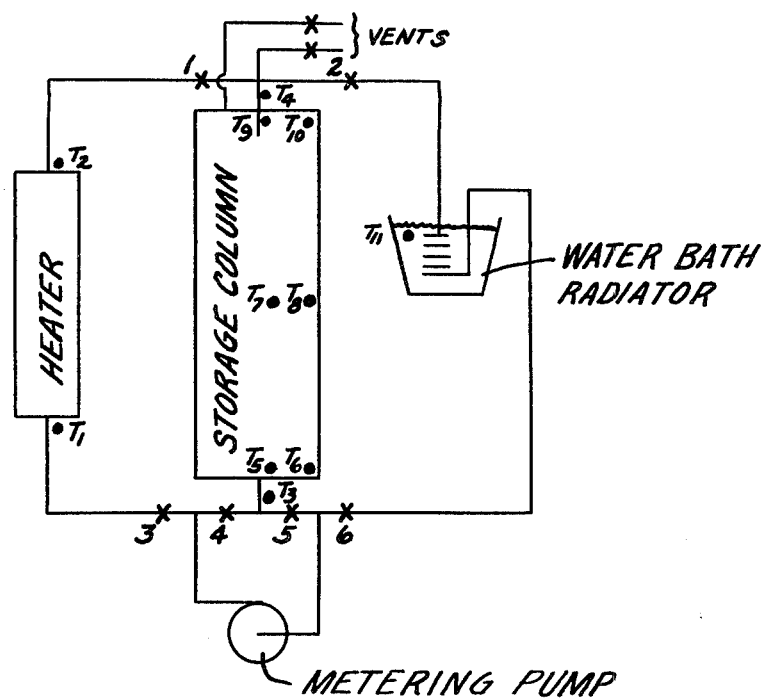
FIG. 1 is a schematic drawing of a pilot plant sized system used to further prove the operability of the invention.

Crosslinked crystalline polymer pieces, e.g., crosslinked polyethylene, polymethylene oxide, isotactic polystyrene, and polypropylene pieces, can be used for storage of thermal energy from a solar collector or other heat source, and this stored energy can be recovered from the pieces and can be used to heat dwellings. Polyethylenes of varying degrees of linearity (crystallinity) and with melting points ranging from 100° to 136° C. are commercially available, and crystalline polypropylenes are also available. Depending on their linearity (crystallinity), these polyethylenes have a heat of fusion ranging from about 10 to 50 calories/gram. Thus, it is possible to store significant quantities of energy by heating pieces of these crystalline polymers above their melting points. Unfortunately, heating pieces of these crystalline (linear) polyethylenes to a temperature above their melting points will allow them to flow and to eventually coalesce into a large mass which would have inefficient heat transfer characteristics.

It may be advantageous in order to develop the maximum crystallinity, and heat of fusion, to anneal the polyethylene pieces after fabrication and prior to crosslinking. This has the further benefit that the crosslinking when it is accomplished occurs mainly in the remaining amorphous regions. Thus the crosslinking necessary for form stability can be achieved with less reduction in crystallinity. Optimum annealing temperature for crystalline polyethylene is approximately 8/9 of the absolute melting point. For high density polyethylene this temperature is ~90° C.

Crosslinked pieces of polyethylenes and other crystalline polymers can be prepared so as to prevent flow and coalescence at elevated temperatures, and to make available, thereby, pieces of the product which can be repeatedly cycled to temperatures above and below the crystalline melting point of the polymer without coalescence. Such pieces can provide a porous bed through which heat can be transferred by fluids, i.e., liquids or gases.

The production of crosslinked polyethylene pieces can be accomplished by any one of a number of methods. One method is to incorporate an organic peroxide into the polyethylene by compounding in an extruder. For example, commercial polyethylene can be blended with 0.1% to 5% of a peroxide such as dicumyl peroxide, in a Banbury mixer, an extruder, a mill roll, or other plastic compounding device. Then the crosslinked polymer can be fabricated into pieces by extrusion and cutting or other conventional means well known in the art. These compounded, fabricated pieces can then be subjected to additional heating, if necessary, in order to complete the crosslinking to the desired degree.

Alternatively, pieces of polyethylene can be subjected to irradiation by electron bombardment, or gamma rays, or be crosslinked by other conventional ways, in order to effect crosslinking sufficient to prevent melt flow and coalescence at a temperature above the melting points of the crystalline phase of the polymer.

Various methods are available for crosslinking polyethylene (PE), such as radiation-crosslinking, grafting of an alkoxysilyl group onto PE with subsequent crosslinking, and crosslinking with peroxides.

Radiation crosslinking has several disadvantages which make it less attractive than the other methods cited. It is largely a surface phenomena, carried out near ambient temperatures, rather than in a melt. This would make it difficult to apply uniformly to thick samples, i.e., pieces and the like.

Crosslinked pieces of polyethylene can then be placed in a metal or other suitable container through which liquids or gases can be circulated for heat exchange.

Crosslinked crystalline polymer pieces can also be used for storage of thermal energy from sources other than solar energy collectors, such as geothermal and waste from conventional or nuclear power generation. For these uses it may be more desirable to use crosslinked crystalline polymers having higher melting points higher than polyethylene, such as polymethylene oxide (polyformaldehyde), isotactic polystyrene, etc., however crosslinked crystalline polyethylene can still be used for heat recovery supplementary to other primary heat exchange recovery that reduces the temperature of the fluid being cooled to a temperature closer above the melting point of polyethylene.

Low levels of crosslinking will be used in the crystalline polyethylene and other crystalline polymers, so the crosslinking does not significantly reduce the crystallinity of the polymer. Statistically, one crosslink per molecule (2000 $CH_2$ units) should be sufficient to eliminate melt flow and reduce total crystallinity less than 1%.

Pieces are used in this application to distinguish from powder and small particles which would not be nearly as suitable for the heat storage uses of this invention. Pieces can be circular, cylindrical, square, rectangular, short fibers either solid or hollow, saddles, rods, pellets, most any shape that packing for columns normally takes, but generally pieces having about equal dimensions in all directions are desirable, i.e., most closely approximating spherical. Alternatively, rather than packing a heat exchanger with pieces of the crosslinked crystalline polymer, the heat exchanger can be filled with the polymer as film and in a form such as a helix to provide greater surface area, or long solid or hollow fibers or tubes running from end to end in the heat exchanger or the like. The heat exchanger can also be compression molded or injection molded from the uncrosslinked crystalline polymer, which is subsequently crosslinked by heating, providing suitable passages through the heat exchanger for the heat exchange fluid. For the long hollow fibers or tubes the heat exchange fluid or fluids can be circulated over the outside surface of the fibers and/or through the hollow portion of the fibers.

A stack of perforated sheets of polymer can be used with the perforations in line to provide for circulation of fluid through the stack.

A solar energy concentration collection device such as that described in FIG. 11 of Winston, U.S. Pat. No. 3,923,381 will be suitable to heat the fluid medium above the melting point of the crosslinked crystalline polyethylene and store heat therein in the system of the invention. Other types of solar energy collection devices known in the art will also be suitable, provided they heat the fluid medium above the melting point of the polymer pieces.

For dissipation of the thermal energy stored in the crosslinked crystalline polymer pieces, fluid can be circulated through, e.g., conventional house heat radiation systems, at a temperature below the melting point of the pieces.

The desirable temperature range of operation for cycling around crosslinked crystalline polyethylene pieces is about 90° to 150° C. For other crosslinked crystalline polymer pieces, the desired temperature range for cycling would be expected to vary somewhat depending on the melting point of the particular polymer.

Varying amounts of peroxide can be incorporated into a crystalline, high density polyethylene, using different methods for crosslinking. Crystalline high density linear polyethylene is available commercially from a number of different companies. A number of different peroxides are also commercially available from different companies. Dicumyl peroxide, 2,5-dimethyl-2,5-bis(t-butylperoxy)hexane (Lupersol 101) and 2,5-dimethyl-2,3-bis(t-butylperoxy)hexyne-3 (Lupersol 130) are examples of suitable peroxides.

Measurements performed on the crosslinked PE included: Observation of the approximate melting point and form-stability on a Fisher-John's melting point apparatus; differential scanning calorimetry (DSC) determinations of melting and recrystallization temperatures, and heat of fusion, on cycling around the crystalline melting point; and behavior (qualitative) after melting in a liquid heat transfer medium. Also tests were carried out in a pilot plant unit cyclically heating and cooling a bed of crosslinked polyethylene pieces.

Two different methods used in crosslinking the polyethylene are discussed and they are as follows:

Method I

In this method the dicumyl peroxide was incorporated into the polyethylene (PE) on a steam-heated mill roll and the crosslinking was carried out on the mill roll. The PE pieces (~50 g) were first melted on the mill, then as soon as a smooth sheet of PE was formed, the dicumyl peroxide was added. Milling was continued as long as possible in order to maximize the crosslinking. However, after a few minutes or so, the crosslinked PE would no longer remain on the rolls but came off as one solid piece of opaque PE. Crosslinking had proceeded to a sufficient degree that melting and flowing of the PE around the rolls was no longer possible. Initially, some variations in milling time was tried, but it was quickly found that the maximum possible time needed on the roll was only a few minutes however to be able to produce an improvement in form stability.

Method II

In this method the dicumyl peroxide was incorporated into the PE on the mill roll but milling was continued only long enough to effect mixing. The PE sheet was then removed and transferred to a 6"×6" mold and crosslinking accomplished by compression molding for ~30 min. at 350° F./700 psi. The press used in this case was both steam and electrically heated in order to reach the 350° F. temperature. Method II is the superior method and the one used in data reported herein.

Regardless of the crosslinking method used, the crosslinked polyethylene was treated in the same manner, in order to obtain smaller particles from it. First, the crosslinked sheet was cut into long narrow strips on a bandsaw. These strips were then cut into small, rectangular pieces on a "chopper". The strips had to be fed into the chopper manually due to their relatively small size. These rectangular particles of crosslinked PE were then used for testing purposes.

Three different tests were performed on the crosslinked polyethylene materials: (1) approximate melting point and form-stability; (2) DSC determinations of melting and recrystallization temperatures and heat of fusion; and (3) melting in a liquid heat transfer medium to determine if the particles would "stick" to one another on cooling. A more detailed description of each test follows.

Melting Point and Form-Stability

The initial test performed on all of the crosslinked PE samples was to determine approximately the crystalline melting point and whether or not the sample flowed on melting (i.e., form-stability). This was done on a Fisher-Johns melting point apparatus. "Melting" was presumed to occur when the PE sample changed from opaque to clear. Simultaneously, it could be determined whether or not the sample "flowed" on melting (i.e., if it was form-stable or not). Generally, "crosslinked" PE samples which did not pass this initial test were not tested further, since it was obvious from this that they had not been sufficiently crosslinked to make them form-stable.

DSC Testing of Crosslinking Polyethylenes

In order to accurately determine the melting and recrystallization temperatures of those crosslinked polyethylene samples which did exhibit form-stability on melting, differential scanning calorimetry (DSC) was used. The instrument used was the Perkin-Elmer DSC-1B. Two or more melting and recrystallization cycles were run for each sample to determine what changes, if any, occurred on repeated cycling about the crystalline melting point. Instrument conditions used were as follows: 10° C. rise in temperature per minute, range 8, scan 305°–435° K., and cool to recrystallize PE.

Heating Crosslinked PE in Liquid Media

In order to simulate the behavior of the crosslinked PE if it were contained in a storage reservoir and a liquid heat transfer agent circulated through it, some of the crosslinked PE was placed in such a liquid medium and cycled around the crystalline melting point. On cooling, observations were made as to whether or not the particles "stuck" together. The test was done in a glass beaker, and gentle agitation provided by a stirring bar. Either silicone fluid (DC-200, 500 cs viscosity) or ethylene glycol was used as the liquid medium. Samples went through one or more melting cycles, unless the particles "stuck" after the first cycle.

A number of manufacturers of high density polyethylenes (HDPE) sent samples and literature on their products. The HDPE products received were evaluated via DSC measurements to determine which have maximum heats of fusion (and hence crystallinity). The basic polymer selected for crosslinking and testing in the pilot plant scale testing unit described schematically in FIG. 1 was Du Pont's Alathon 7040, although others would be suitable.

Preparation of a Five-Pound Batch of Silane-Grafted Crosslinked HDPE

The incorporation of a vinyl silane into a HDPE resin, followed by extrusion and crosslinking was carried out. The general procedure used followed examples given in U.S. Pat. No. 3,646,155 with variations described below.

Some improvements were made in the process used here, in order to optimize the grafting reaction. Use of an extruder or a Banbury mixer, instead of the hot mill roll, for carrying out the grafting reaction provides two advantages: (1) it is much more of a "closed" system than is the mill roll, thus reducing loss of the silane and (2) somewhat higher temperatures and better mixing, can be obtained with the shearing action of the Banbury.

Preferred Silane Grafting and Crosslinking Procedure

The following procedure and reactants are employed in the preparation of silane-grafted and crosslinked HDPE.

1. A charge of 2000 g of Alathon 7040 HDPE (Du Pont) pieces is added to a large Banbury mixer and fluxed 4 to 5 minutes at a temperature slightly above RT (no steam). A charge of 120 g (6 phr, i.e. parts per hundred parts resin) vinyl triethoxy silane (Union Carbide A-151) containing 4 g (0.2 phr) benzoyl peroxide is added and 5 minutes of mixing with steam on (120 psi) begun. At the end of this time, cooling water is turned on and the ~4 lb silane-grafted PE cake removed from the Banbury after 2 min. cooling time.

2. The grafted PE cake is next cold pressed into round flat discs which can readily be cut into strips via a band-saw, and then granulated into flakes or pieces suited for extrusion.

3. The silane-grafted flakes are next co-extruded in a 95/5 (w/w) ratio with a catalyst batch [consisting of 100 parts Alathon 7040, 1 phr dibutyl tin dilaurate and 0.15 phr benzoyl peroxide prepared via mixing on a hot mill roll, and granulated into flakes] using a 1" extruder (2 passes, all zones at 165° C.) and chopped into pieces.

4. These silane-grafted HDPE pieces are next crosslinked by heating in boiling water for $\leq$24 hours, removed, and air (or low-temperature) oven-dried. A sample of crosslinked pieces heated in air and 200° C. exhibited excellent form stability (no flow); neither did the pieces tend to stick to one another when cycled around the PE melting point in ethylene glycol several times or so.

Although the exact mechanism of the silane grafting and crosslinking reaction with PE is not totally certain, the reaction is believed to proceed largely as follows:

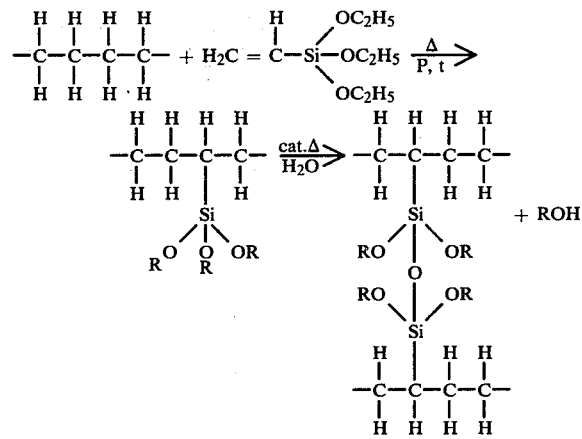

A five-pound batch of silane-grafted and crosslinked Alathon 7040 HDPE was evaluated for thermal energy storage (TES) capabilities in the macroscale TES evaluation unit. The usual characterization data (DSC, gel contents, etc.) was obtained on it.

Preparation of $\geq$ five pounds each of (1) a thermally initiated peroxide crosslinked commercial HDPE and (2) a silane-grafted and crosslinked commercial HDPE for evaluation in the macroscale TES unit was completed.

Macroscale evaluation of one five-pound sample of peroxide-crosslinked Alathon 7040 (prepared via milling and compression molding) was completed. Characterization of the uncrosslinked control Alathon 7040 resin, and the crosslinked resin (before and after testing in the TES unit) was carried out. Results are given in Table I.

A second five-pound sample of peroxide-crosslinked Alathon 7040 (prepared via extrusion only) has been evaluated briefly in the TES unit and is also being characterized (Table II).

Extrusion-Crosslinking Process for PE

A simple, essentially one-step extrusion process for the crosslinking of HDPE was carried out as follows: Alathon 7040 HDPE (Du Pont) pieces were tumble-blended with 0.25 phr of Lupersol 130 (Lucidol Div. of Pennwalt) peroxide in 1.25 phr of paraffin oil (diluent), then extruded at ~180° C. (die temp.) in a $\frac{3}{4}$" extruder. "Spiralled" rods are extruded which are then chopped into pieces which do not flow when melted in air or stick together on melting in ethylene glycol.

Macro-Scale Evaluation of TES Polymers

Testing with the macro-scale prototype TES unit has been carried out. The unit, with a 1" insulating coat of portland cement/asbestos on the storage chamber, heater and connecting plumbing, is shown schematically in FIG. 1.

Circulation is top to bottom through the storage chamber in the heating phase, with valves 1, 3 and 5 open. Reversing the valve positions (2, 4 and 6 open) reverses the cirection of flow and circulates through the radiator instead of the heater for the cooling phase. Thus, the pumping direction corresponds to the natural convective flow direction in heating, and charges the storage chamber from the top downward. The flow direction is reversed in cooling to discharge from the hottest zone of the storage chamber. The exchange fluid is preheated in the lower, cooler zones before reaching the maximum temperature top zone.

Heating is provided by two steel immersion type resistance heaters with 300 and 500 watt capacities. Operating at about 700 watts (87.5%) the heating unit raises the temperature of a 150 ml/min ethylene glycol stream about 65° C. This should produce a heating time of approximately three hours to raise the storage chamber temperature from 110° to 150° C., the anticipated cycle range.

Figure 2:
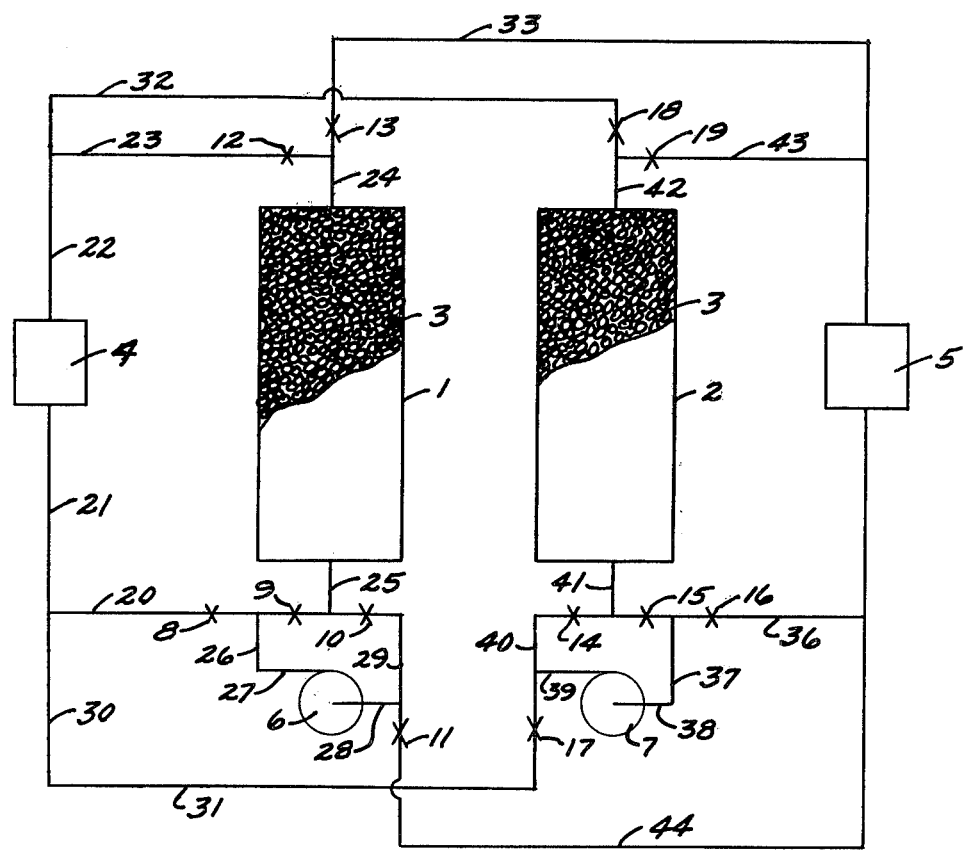
FIG. 2 is a schematic view of a heating system of the invention.

Thermocouples, shown at $T_1$ to $T_{11}$ in FIG. 2, will be used to define the heat exchange rate and the total energy storage capacity of the system. The metering pump provides a constant and precise circulating flow rate. Thus by monitoring the storage chamber inlet and outlet temperatures, and knowing the fluid volume and specific heat, we can calculate the total energy stored.

TABLE I

Characterization of Five-Pound Samples of Peroxide-Crosslinked Alathon 7040 HDPE[a]
Before and After Cycling Around M.P. in Ethylene Glycol

| Sample No. | Crosslinking Conditions Peroxide and Conc. (phr) | Method | No. of Melting Cycles in TES unit (Ethylene Glycol) | DSC Sample | DSC Results[b] Cycle | $T_m$ (°C.) | $T_c$ (°C.) | $\Delta H_f$ (cal/g) | Ave. $\Delta H_f$/DSC Sample (cal/g) | Overall Average $\Delta H_f$ (cal/g) | % of Starting $\Delta H_f$ Retained | Melt Index[c] (g/10 min/ 190° C.) |
|---|---|---|---|---|---|---|---|---|---|---|---|---|
| 1 | — | — | none | 1 | 1 | 130 | 110 | 45.5 | 45.3 | | | |
| | | | | | 2 | 131 | 110 | 44.8 | | | | |
| | | | | | 3 | 131 | 110 | 45.8 | | | | 5.76 |
| | | | | 2 | 1 | 133 | 109 | 44.5 | 47.3 | 46.4 | — | |
| | | | | | 2 | 132 | 108 | 47.5 | | | | |
| | | | | | 3 | 132 | 109 | 47.0 | | | | |
| | | | | 3 | 1 | 130 | 110 | 43.8 | 46.5 | | | |
| | | | | | 2 | 132 | 110 | 46.2 | | | | |
| | | | | | 3 | 132 | 110 | 46.8 | | | | |
| 2 | Lupersol 101 (0.5 phr) | Peroxide hot milled into PE & compression molded 30'/ 350° F. | none | 1 | 1 | 131 | 109 | 42.7 | 40.6 | | | Could not be extruded |
| | | | | | 2 | 130 | 109 | 39.6 | | | | |
| | | | | | 3 | 130 | 109 | 39.6 | | | | |
| | | | | 2 | 1 | 130 | 109 | 38.1 | 36.7 | | | |
| | | | | | 2 | 129 | 109 | 35.2 | | | | |
| | | | | 3 | 1 | 130 | 108 | 38.0 | 36.7 | 38.9 | 84% (of above) | |
| | | | | | 2 | 128 | 108 | 35.2 | | | | |
| | | | | 4 | 1 | 132 | 110 | 39.4 | 38.6 | | | |
| | | | | | 2 | 131 | 110 | 37.8 | | | | |
| | | | | 5 | 1 | 133 | 110 | 43.8 | 42.1 | | | |
| | | | | | 2 | 131 | 109 | 40.3 | | | | |
| 3 | Lupersol 101 (0.5 phr) | Peroxide hot milled into PE and compression molded 30'/ 350° F. | 16 | 1 | 1 | 132 | 108 | 38.8 | 37.5 | | | Could not be extruded |
| | | | | | 2 | 129 | 108 | 36.1 | | | | |
| | | | | 2 | 1 | 132 | 109 | 37.8 | 36.9 | | | |
| | | | | | 2 | 129 | 109 | 35.9 | | | | |
| | | | | 3 | 1 | 130 | 109 | 36.6 | 35.4 | 37.4 | 96% (of $\Delta H_f$ before TES unit cycling) | |
| | | | | | 2 | 128 | 108 | 34.2 | | | | |
| | | | | 4 | 1 | 132 | 108 | 38.1 | 37.6 | | | |
| | | | | | 2 | 130 | 108 | 37.1 | | | | |
| | | | | 5 | 1 | 133 | 109 | 41.3 | 39.5 | | | |
| | | | | | 2 | 130 | 108 | 37.7 | | | | |

[a] Alathon 7040 HDPE, Du Pont
[b] DSC Conditions:
10° C./min. heating and cooling rate, range 8, chart speed - 20 mm/min., indium standard.
$T_m$ = melting temperature (peak)
$T_c$ = recrystallization temperature (peak)
$\Delta H_f$ = heat of fusion (crystalline melting)
[c] ASTM D - 1238

TABLE II

Characterization of Five-Pound Samples of Peroxide-Crosslinked Alathon 7040 HDPE[a]
Before and After Cycling Around M.P. in Ethylene Glycol

| Sample No. | Crosslinking Conditions Peroxide and Conc. (phr) | Method | No. of Melting Cycles in Ethylene Glycol | DSC Sample | DSC Results[b] Cycle | $T_m$ (°C.) | $T_c$ (°C.) | $\Delta H_f$ (cal/g) | Ave. $\Delta H_f$/DSC Sample (cal/g) | Overall Average $\Delta H_f$ (cal/g) | % of Starting $\Delta H_f$ Retained | Melt Index[c] (g/10 min/190° C.) |
|---|---|---|---|---|---|---|---|---|---|---|---|---|
| 1 | — | — | none | 1 | 1 | 129 | 109 | 43.7 | 47.0 | 46.5 | — | 6.28 |
|  |  |  |  |  | 2 | 131 | 109 | 47.5 |  |  |  |  |
|  |  |  |  |  | 3 | 131 | 109 | 46.4 |  |  |  |  |
|  |  |  |  | 2 | 1 | 129 | 109 | 43.4 | 46.5 |  |  |  |
|  |  |  |  |  | 2 | 132 | 110 | 47.4 |  |  |  |  |
|  |  |  |  |  | 3 | 131 | 109 | 45.6 |  |  |  |  |
|  |  |  |  | 3 | 1 | 130 | 109 | 44.0 | 46.0 |  |  |  |
|  |  |  |  |  | 2 | 132 | 109 | 46.0 |  |  |  |  |
|  |  |  |  |  | 3 | 132 | 109 | 45.9 |  |  |  |  |
| 2 | Lupersol 130 (0.25 phr) | Dry-blending of peroxide and PE/RT followed by extrusion @180° C. | none | 1 | 1 | 129 | 114 | 38.1 | 38.6 | 38.0 | 82% (of above) | Could not be extruded |
|  |  |  |  |  | 2 | 129 | 114 | 39.0 |  |  |  |  |
|  |  |  |  | 2 | 1 | 128 | 114 | 35.4 | 36.4 |  |  |  |
|  |  |  |  |  | 2 | 128 | 114 | 37.4 |  |  |  |  |
|  |  |  |  | 3 | 1 | 128 | 115 | 37.3 | 38.1 |  |  |  |
|  |  |  |  |  | 2 | 130 | 114 | 38.8 |  |  |  |  |
|  |  |  |  | 4 | 1 | 130 | 112 | 37.8 | 38.7 |  |  |  |
|  |  |  |  |  | 2 | 131 | 112 | 39.5 |  |  |  |  |
|  |  |  |  | 5 | 1 | 130 | 116 | 43.3 | 43.4 |  |  |  |
|  |  |  |  |  | 2 | 130 | 116 | 43.4 |  |  |  |  |
| 3 | Lupersol 130 (0.25 phr) | Dry-blending of peroxide and PE/RT followed by extrusion @180° C. | 6 | 1 | 1 | 126 | 114 | 35.8 | 37.0 | — | 97% (of $\Delta H_f$ before cycling) | — |
|  |  |  |  |  | 2 | 128 | 114 | 37.7 |  |  |  |  |
|  |  |  |  |  | 3 | 128 | 114 | 37.4 |  |  |  |  |

[a]Alathon 7040 HDPE, Du Pont
[b]DSC Conditions:
10° C./min. heating and cooling rate, range 8, chart speed - 20 mm/min., indium standard
$T_m$ = melting temperature (peak)
$T_c$ = recrystallization temperature (peak)
$\Delta H_f$ = heat of fusion (crystalline melting)
[c]ASTM D - 1238

The $\Delta H_f$ values of the two peroxide-crosslinked five-pound samples of Alathon 7040 are also within one cal/g (38–39) of one another and represent 82–84% retention of the $\Delta H_f$ of the original polymer.

The Lupersol 130 peroxide-crosslinked (via extrusion) sample shows no change (or a slight increase) on going from the first to the second DSC melting cycle. Sample uniformity does not appear to be as good, however, as the Lupersol 101. Both peroxide-crosslinked samples retain ≧96% of their initial $\Delta H_f$ values after cycling several times or so around the melting point in ethylene glycol.

Seven pounds of silane grafted and crosslinked Alathon 7040 HDPE was prepared, as described above, to have sufficient material for testing in the macroscale TES unit. Characterization of the total ~7 pound sample of silane-grafted, crosslinked PE was carried out, along with smaller samples of the same silane-grafted but uncrosslinked (and partially crosslinked) material. Results are given in Table III.

Form-stability of the seven-pound silane-grafted material which had been crosslinked for 40 hours in boiling H₂O was very good. Neither the uncrosslinked, silane-grafted sample, nor one which was crosslinked only 18 hours in boiling water, had sufficient form stability to be useful for TES purposes.

Probably of most significance is the fact that the heat of fusion ($\Delta H_f$) value (42.8 cal/g) of the crosslinked material is very close to the initial $\Delta H_f$ for the uncrosslinked Alathon 7040 HDPE (46.5 cal/g). Thus ~92% of the polymer's original heat of fusion is retained even after sufficient crosslinking to achieve form-stability. This is significantly higher than that retained by the peroxide-crosslinked HDPE samples (82–84%).

The sample (batch-to-batch) uniformity appears to be very good, from the close agreement of the $\Delta H_f$ values in successive DSC melting cycles, and also after cycling 6 times around the melting point in ethylene glycol.

TABLE III

Characterization of Five-Pound Sample of Silane-Grafted (and Crosslinked) Alathon 7040 HDPE[a]

| Sample No. | Crosslinking Conditions | Observations[a] on Form-Stability | DSC Sample | Cycle | $T_m$ (°C.) | $T_c$ (°C.) | $\Delta H_f$ (cal/g) | Ave. $\Delta H_f$/DSC Sample (cal/g) | Overall Average $\Delta H_f$ (cal/g) | % of Starting $\Delta H_f$ Retained |
|---|---|---|---|---|---|---|---|---|---|---|
| 1 | Silane-grafted (8 phr) and coextruded with catalyst-containing PE batch (not crosslinked). | Pieces "flatten out" as they melt; stick together firmly even at R.T. | 1 | 1<br>2<br>3 | 131<br>131<br>131 | 116<br>116<br>116 | 43.2<br>43.0<br>42.9 | 43.0 | — | 92[d] |
| 2 | Same as 1 above plus crosslinked 18 hr/boiling H₂O. | Slight "flattening" of pieces; stick together slightly in melt, not at R.T. | 1 | 1<br>2<br>3 | 132<br>131<br>131 | 116<br>116<br>116 | 47.4<br>44.8<br>43.5 | 44.2 | — | 95[d] |
| 3 | Same as 1 above plus crosslinked 40 hr/boiling H₂O | Virtually no "flattening" of pieces on melting; very slight sticking in melt, none at R.T. | 1<br><br>2<br><br>3<br><br>4<br><br>5 | 1<br>2<br>3<br>1<br>2<br>3<br>1<br>2<br>3<br>1<br>2<br>3<br>1<br>2<br>3 | 132<br>132<br>132<br>132<br>131<br>131<br>132<br>132<br>132<br>132<br>132<br>132<br>132<br>132<br>132 | 115<br>115<br>115<br>115<br>116<br>116<br>115<br>115<br>115<br>115<br>115<br>115<br>115<br>115<br>115 | 46.0<br>43.5<br>42.2<br>45.4<br>43.2<br>42.0<br>44.9<br>43.5<br>42.4<br>45.5<br>42.9<br>42.1<br>45.5<br>42.4<br>43.2 | 42.9<br><br>42.6<br><br>43.0<br><br>42.5<br><br>42.8 | 42.8 | 92[d] |
| 4 | Same as 3 above and cycled 6× around m.p. in ethylene glycol. | A few pieces stick together after 6 cycles (in ethylene glycol) - most not at all or break apart readily/R.T. | 1 | 1<br>2<br>3 | 130<br>130<br>130 | 116<br>116<br>116 | 41.3<br>39.5<br>39.5 | 39.5 | | 92 (of 3) |

[a]Alathon 7040 HDPE, Du Pont
[b]Form Stability:
Observations on heating in air to 200° C. on Fisher-Johns m.p. block (unless otherwise noted).
[c]DSC Conditions:
10° C./min. heating and cooling rate, range 8, chart speed - 20 mm/min., indium standard.
$T_m$ = melting temperature (peak)
$T_c$ = recrystallization temperature (peak)
$\Delta H_f$ = heat of fusion (crystalline melting)
[d]Compared to $\Delta H_f$ of 46.5 cal/g for Alathon 7040 HDPE.
[e]ASTM D - 1238

Characterization of the five-pound samples of crosslinked HDPE materials prepared for evaluation in the four-liter TES test unit was completed. Results are given in Table IV.

As had been noted previously, the silane-grafted-crosslinked HDPE material retained a higher percentage of the $\Delta H_f$ of the starting Alathon 7040 HDPE resin, 7–10% more than did either of the peroxide-crosslinked HDPE's. Also, although not shown here, all $\Delta H_f$ values were averages of 5 separate DSC samples, and the range of values for the silane-grafted-crosslinked HDPE was much narrower than for the peroxide-crosslinked samples.

TABLE IV

Physical Characteristics of the Three Prime Candidate Form-Stable Crystalline Polyethylene Pieces and Their Precursors Initially and After Multiple Melt-Freeze Cycles

| Material Ref. No. | Crosslinking Conditions | | 4L-TES Unit Evaluation | | DSC Results[a] | | |
|---|---|---|---|---|---|---|---|
| | Agent & Conc. (phr) | Process | Melt-Freeze Cycles | Piece Fusion | $T_m$ (° C.) | $T_c$ (° C.) | $\Delta H_f$ (cal/g) |
| Alathon 7040 | — | — | 0 | — | 132 | 109 | 46 |
| 2 | Lupersol 101 (0.5) | Compression molded 30'/350 psi | 0 | — | 131 | 110 | 39 |
| 3 | Lupersol 101 (0.5) | Compression molded 30'/350 psi | 16 (discontinued) | slightly (12 piece agglomerates) | 130 | 107 | 37 |
| Alathon 7040 | — | — | 0 | — | 131 | 109 | 47 |
| 5 | Lupersol 130 (0.5) | Extruded @180° C. | 0 | — | 130 | 114 | 38 |
| 6 | Lupersol 130 (0.25) | Extruded @180° C. | 3 (discontinued) | fusion of fist size pieces near | — | — | — |

TABLE IV-continued

| | | | | walls & top | | | |
|---|---|---|---|---|---|---|---|
| Alathon 7040 | Vinyl triethoxy silane grafted (8 phr) | not crosslinked | not tested (tested product) | — | 131 | 116 | 43 |
| 8 | Vinyl triethoxy silane grafted (8 phr) | Pieces in boiling H₂O/ 40 hours | 0 | — | 132 | 115 | 43 |

| Material Ref. No. | $\Delta H_f^{(b)}$ Retained (%) | Gel Contents$^{(c)}$ Average (%) | Range (%) | Melt Index$^{(d)}$ (g/10 min/190° C.) | Piece$^{(e)}$ Density (g/cc) |
|---|---|---|---|---|---|
| Alathon 7040 | — | 3.3 | 0–7 | 5.8 | 0.96 (mfgr) |
| 2 | 84 | 19 | 0–29 | N.O. | 0.950 |
| 3 | 80 | 20 | 4–39 | N.O. | — |
| Alathon 7040 | — | 0 | 0.–0.1 | 6.3 | 0.96 (mfgr) |
| 5 | 81 | ~20? | 0–48 | N.O. | 0.947 |
| 6 | — | | | | |
| Alathon 7040 | 91 | 22 | 19–26 | 1.65 | — |
| 8 | 91 | 44 | 39–47 | N.O. | 0.974 |

$^{(a)}$DSC Conditions: 10° C./min heating and cooling rate, range 8, chart speed 20 mm/min; indium standard $\Delta H_f$ values given are averages of 5 separate DSC samples run
$^{(b)}$As compared to $\Delta H_f$ for starting Alathon 7040 HDPE resin
$^{(c)}$After 16 hour extraction in refluxing ethyl benzene. Values are averages of 5 or more separate samples.
$^{(d)}$ASTM-D-1238. N.O. = not obtainable (could not be extruded)
$^{(e)}$Densities by buoyancy method on pellets themselves - manufacturer's data given for starting Alathon 7040 resin.

In addition to the greater uniformity in $\Delta H_f$ value from sample-to-sample, the silane-grafted-crosslinked HDPE also exhibited much greater crosslink uniformity. This is shown by the gel content data as determined by extraction in ethyl benzene, according to a Phillip's Petroleum Company procedure. The peroxide-crosslinked samples varied as much as ±20% or more in gel content, whereas the silane-grafted-crosslinked HDPE varied no more than ±4% for five samples. These differences are no doubt attributable to the processing differences involved. Initial distribution of the peroxide and its subsequent reaction in the polyethylene is probably not as even and uniform as is the silane distribution and grafting reaction, prior to crosslinking.

The decrease in melt index observed on grafting of the silane onto the PE would be expected due to the increase in molecular weight, and the slight increase in density of the crosslinked pellets could be attributed to the Si-O-Si present in the crosslinked polymer. As expected, no melt index values could be obtained on any of the crosslinked materials.

Most of the "small-scale" characterization data on these materials have been completed. Based on the data now available, and on its behavior in the 4 L TES unit, where virtually no fusing of the pieces has occurred after eight cycles, the silane-grafted-crosslinked Alathon 7040 HDPE appears to be a good choice for scale-up and commercial use.

Results obtained with the crosslinked HDPE pieces in the four-liter (2 kg) TES test unit indicate that heat transfer from or through the pieces is not a limiting factor.

Evaluation of the silane-grafted-crosslinked Alathon 7040 HDPE has been continued through eight heating and cooling cycles in the lab-scale TES unit. These pieces show virtually no sintering or agglomeration. Although adequate form stability was achieved with the peroxide-crosslinked HDPE pieces, the silane-grafted-crosslinked material appears to be superior in this respect.

Comparative analysis of the data obtained from testing in this unit shows the silane-grafted-crosslinked PE has ~11% more storage capacity than does the peroxide-cross-linked PE, and 75% more than does ethylene glycol itself, between 150° and 100° C.

Further, on a smaller scale, thermal cycling of all three candidate TES materials has been initiated and carried through 50 cycles. Form stability of the materials has remained unchanged and DSC analysis to determine $\Delta H_f$ after cycling is underway. In addition, the effect of aging the three candidate TES materials in refluxing ethylene glycol is being determined, with no visible changes observed or apparent after three weeks (508 hours) in the molten state. Whereas form stability of any of the pellets has not been a problem, the peroxide-crosslinked HDPE pieces have agglomerated into larger, but porous masses. The silane-crosslinked-grafted pieces have remained separate, however.

The invention will be even more clearly understood from the following detailed description of the accompanying drawings. Two heat exchange columns 1 and 2 contain crosslinked crystalline polyethylene pieces 3 to store and release heat. Suitable ethylene glycol can be used for both the heating and the cooling medium although other liquids with boiling points substantially higher than the melting point of pieces 3 can also be used, e.g., a silicone fluid, or a gas such as air, nitrogen, etc. can be used for the heating and cooling fluid. Solar heating means 4 provides the heat to increase ethylene glycol above the melting point of pieces 3. Other ethylene glycol at a temperature below the melting point of the pieces serves as a cooling medium for pieces heated above their melting point, and the heat recovered in this ethylene glycol cooling medium flows through, e.g., building radiators 5 to dissipate the heat. Pumps 6 and 7 and the various pipes serve to circulate the ethylene glycol. Columns 1 and 2 could represent in each case banks of 2 or more columns to be switched in and out of heating and cooling cycles.

Let us first describe column 1 in a heating cycle. Ethylene glycol leaving the bottom of the column through line 25 flows through pipe 20, valve 10, pipe 29 and pipe 28 to pump 6, valves 9 and 12 being closed. From pump 6 the ethylene glycol flows through pipe 27, pipe 26, pipe 20 through valve 8 to pipe 21 and solar heating means 4, where the ethylene glycol is heated to a temperature above the melting point of the pieces 3 in column 1. From solar heating means 4 the heated ethylene glycol flows through pipe 22, pipe 23, valve 12 and pipe 24 into the top of column 1, and through the pieces 3, valve 13 being closed. When the pieces 3 in column 1 have been heated sufficiently above their melting point, column 1 is isolated with stored heat by suitable valve switching or immediately switched to a cooling cycle to recover the heat.

Let us describe column 2 in a cooling cycle with other ethylene glycol at a temperature below the melting point of pieces 3 in column 2 circulating in column 2. This cooling ethylene glycol leaves pump 7 by pipe 39, proceeds through pipe 40, valve 14 and pipe 41 to the bottom on column 2, valves 17 and 15 being closed. Heated ethylene glycol exits the top of the column 2 through pipe 42 and proceeds through valve 19, pipe 43 and pipe 34 to building heating radiator 5 which dissipate heat and cool the ethylene glycol. From radiators 5 the ethylene glycol proceeds through pipe 35, pipe 3, valve 16, pipe 37 and pipe 38 to pump 7 to complete the cycle, valve 18 being closed.

In switching column 1 to a cooling cycle and column 2 to a heating cycle, pumps 6 and 7 can be stopped and so circulation through the system long enough to make appropriate switches in the valves. Valves 8, 10 and 12 would be closed associated with column 1, and valves 11, 19 and 13 would be opened. For column 2, valves 17, 18 and 15 would be opened, and valves 19, 16 and 14 would be closed. The pumps can then be started to put column 1 in the cooling cycle and column 2 in the heating cycle.

The above discussion illustrates a crude but operable method of operating the system. Vents, possibly heating and cooling ethylene glycol storage and makeup, and the like have been omitted in order not to unduly complicate describing the system, but these are obvious engineering design additions that can be made without the need for further invention. It might also be desirable to have substantially completely separate ethylene glycol for heating and for cooling, which would make desirable draining each column into separate storage vessels (not shown), before switching from heating to cooling modes and vice versa.

When the statement is made throughout this specification and the claims that the polymer pieces do not stick together upon being cycled above and below the melting point of the polymer, it means that although there may be some agglomeration of pieces into larger but porous masses there is no substantial loss in porosity and the agglomerates are porous.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A method for removing heat from a fluid comprising circulating a fluid through crystalline polyethylene silane-grafted-crosslinked polymer pieces crosslinked to retain at least 70% of the heat of fusion of the uncrosslinked crystalline polymer and sufficiently crosslinked for the pieces not to stick together upon being cycled above and below the melting point of said polymer, said fluid having a temperature above the melting point of said polymer.

2. A method of claim 1 wherein said fluid is a gas.

3. A method of claim 1 wherein said fluid is a liquid.

4. A method of claim 1 wherein said pieces are in the form of a bed of pieces.

5. A method for heating a fluid comprising circulating a fluid through crystalline polyethylene silane-grafted-crosslinked polymer pieces crosslinked to retain at least 70% of the heat of fusion of the uncrosslinked crystalline polymer and sufficiently crosslinked for the pieces not to stick together upon being cycled above and below the melting point of said polymer, said polymer pieces having been heated above their melting point prior to fluid circulation through said pieces and said fluid having a temperature below the melting point of said polymer.

6. A method of claim 5 wherein said fluid is a gas.

7. A method of claim 5 wherein said fluid is a liquid.

8. A method of claim 5 wherein said pieces are in the form of a bed of pieces.

9. A method of heat transfer comprising
  (a) circulating a fluid through crystalline polyethylene silane-grafted-crosslinked polymer pieces crosslinked to retain at least 70% of the heat of fusion of the uncrosslinked crystalline polymer and sufficiently crosslinked for the pieces not to stick together upon being cycled above and below the melting point of said polymer, said fluid having a temperature above the melting point of said polymer to store heat in said pieces, then
  (b) circulating a fluid through said heated pieces, said fluid having a temperature below the melting point of said polymer to recover heat from said pieces.

10. A method of claim 9 wherein said fluid is a gas.

11. A method of claim 9 wherein said fluid is a liquid.

12. A method of claim 9 wherein said pieces are in the form of a bed of pieces.

13. Crystalline polyethylene pieces crosslinked with a grafted silane to retain at least 70% of the heat of fusion of uncrosslinked crystalline polyethylene and sufficiently crosslinked for the pieces not to stick together upon being cycled above and below the melting point of said polymer.

14. A heat exchange vessel containing as a heat storage medium crystalline polyethylene pieces crosslinked with a grafted silane to retain at least 70% of the heat of fusion of uncrosslinked crytalline polyethylene and sufficiently crosslinked for the pieces not to stick together upon being cycled above and below the melting point of said polymer.

* * * * *